Dec. 17, 1929.  J. G. BLUNT  1,740,150
TRUCK FOR RAILROAD VEHICLES
Filed Jan. 16, 1928   4 Sheets-Sheet 4
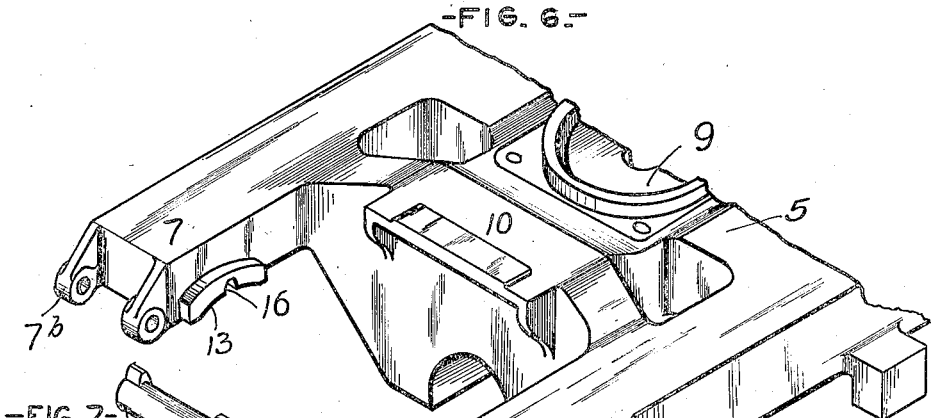
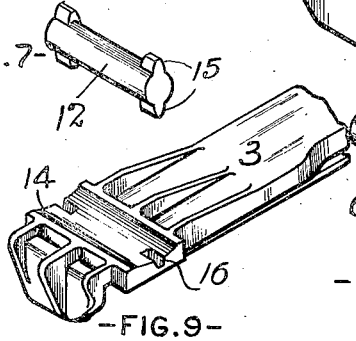
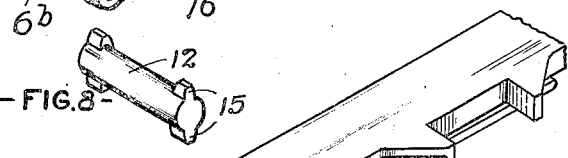
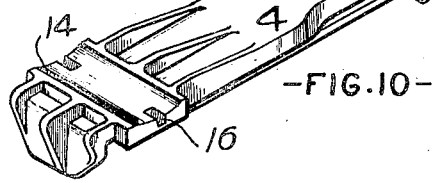
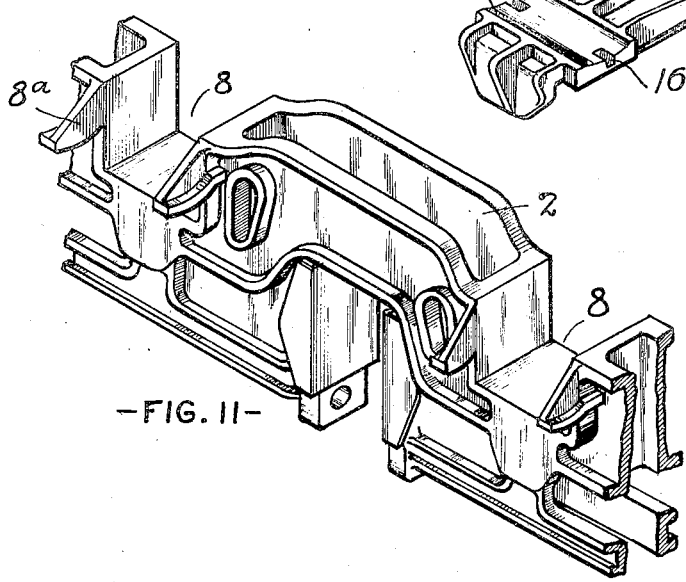
WITNESSES
INVENTOR Patented Dec. 17, 1929

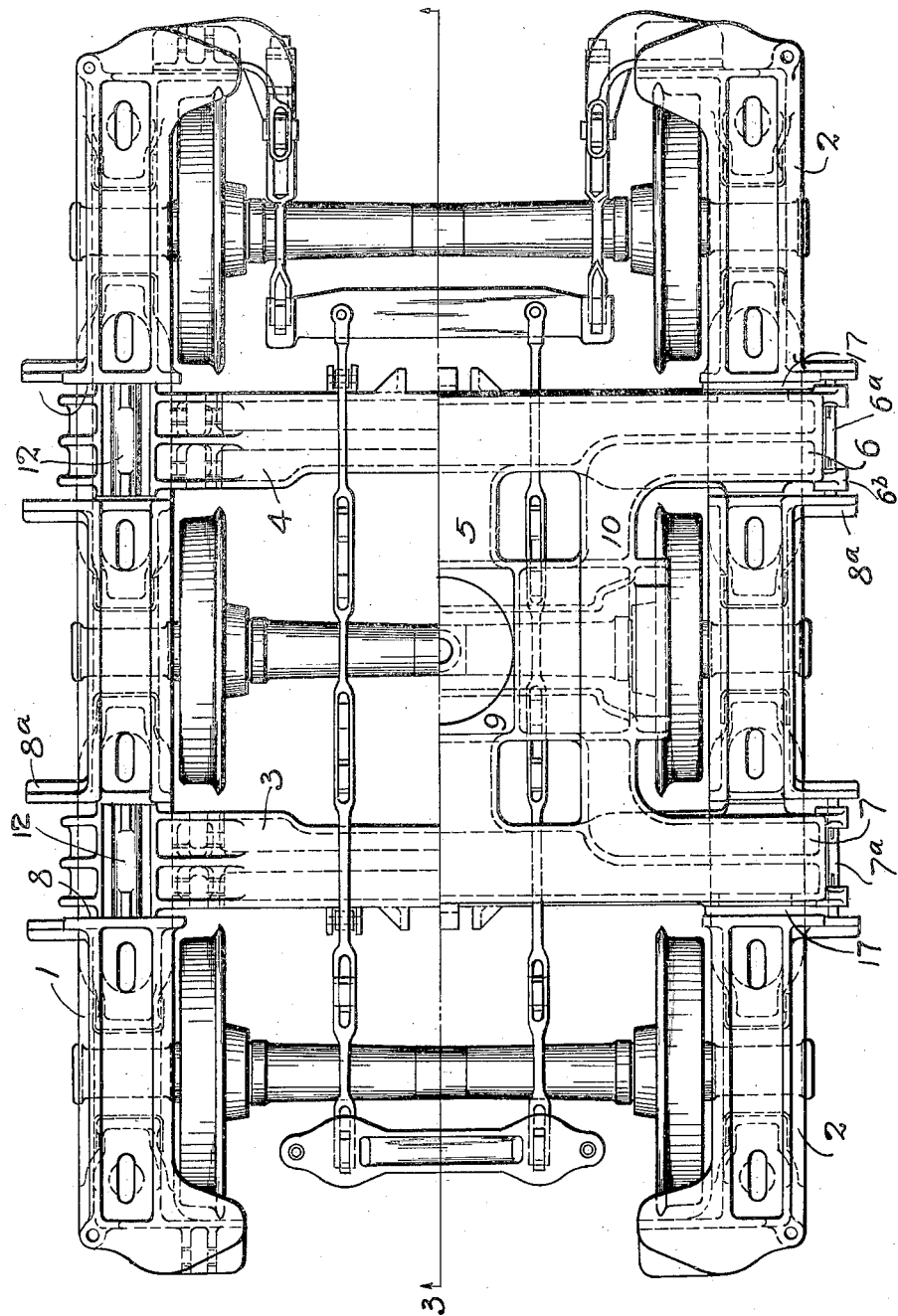

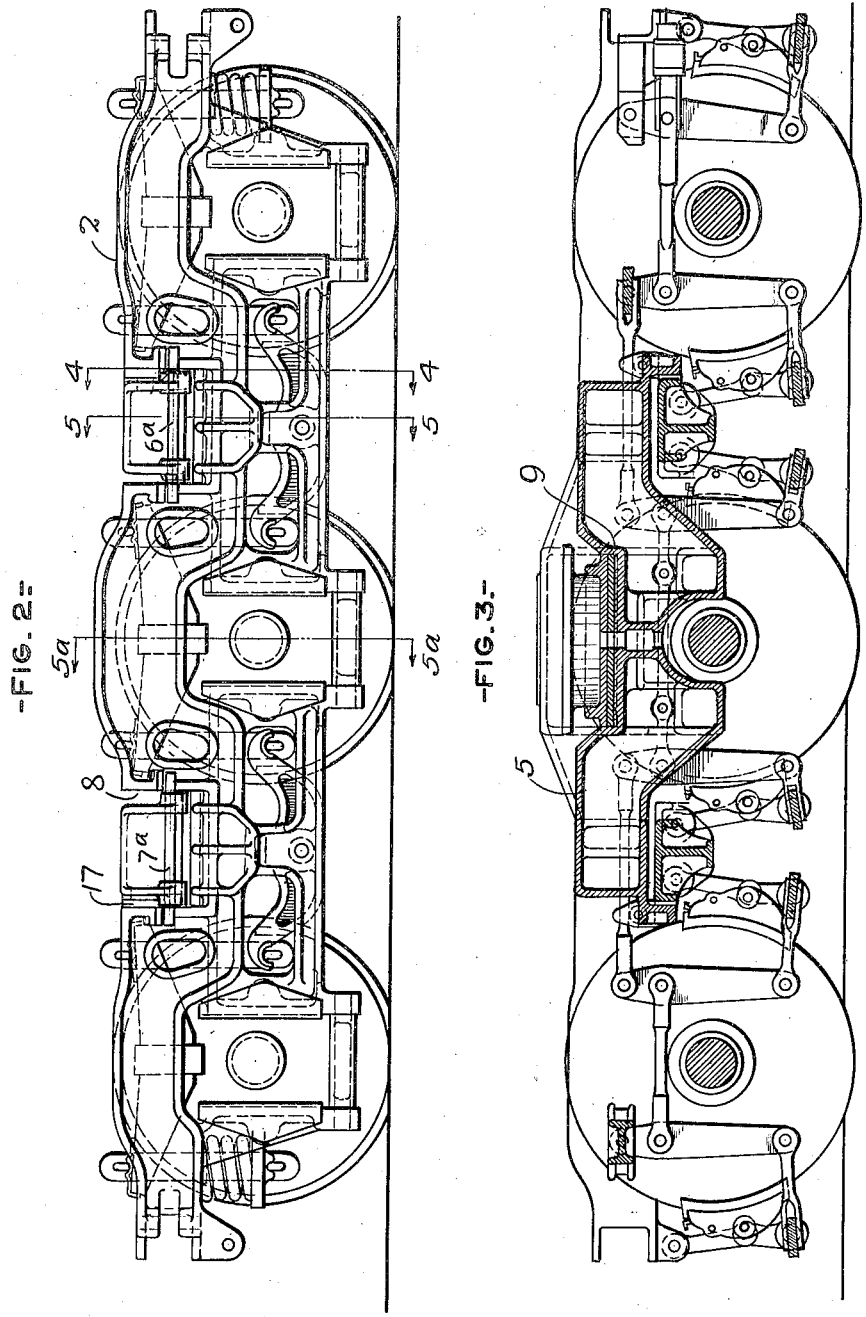

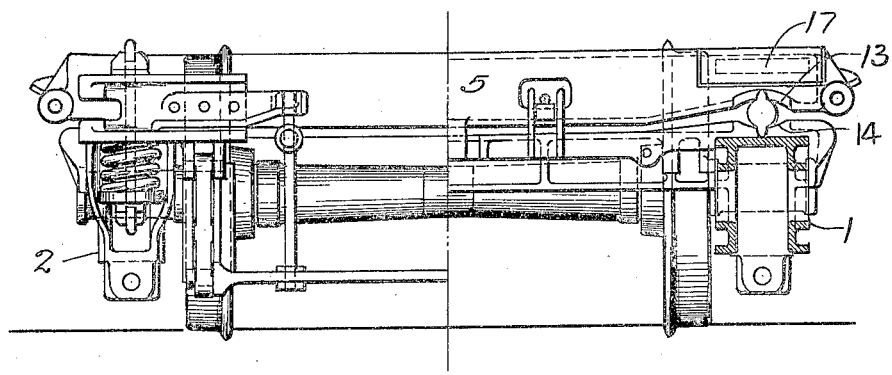
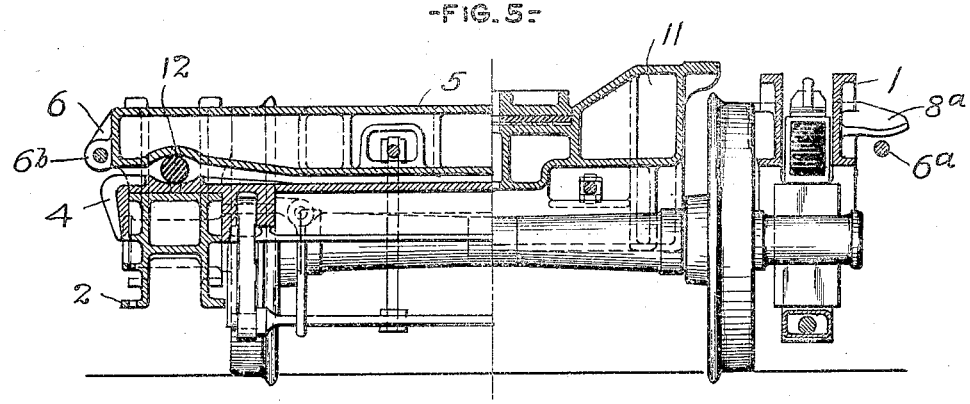

1,740,150

UNITED STATES PATENT OFFICE

JAMES G. BLUNT, OF SCHENECTADY, NEW YORK

TRUCK FOR RAILROAD VEHICLES

Application filed January 16, 1928. Serial No. 247,058.

This invention relates generally to the class or type of appliances known as trucks for railroad vehicles, and its object is to provide an improved construction of frame, for a truck of such type, having six wheels, and one in which the superstructure and bolster may have a limited degree of lateral movement on the frame. The improved truck is particularly suitable for application in high speed heavy duty railroad cars, locomotives and tenders.

The improvement claimed is hereinafter fully set forth.

In the accompanying drawings: Figure 1 is a plan view of the improved truck, with one-half of the bolster removed; Fig. 2, a side elevation of the same; Fig. 3, a longitudinal section, on the line 3—3 of Fig. 1; Fig. 4, an end view, in the left half, and a section taken on the line 4—4 of Fig. 2, in the right half; Fig. 5, a section, on the line 5—5 of Fig. 2, in the left half, and on the line 5ª—5ª of Fig. 2, in the right half; Fig. 6, an isometric view of one-half of the bolster; Figs. 7 and 8, similar views of the anti-friction rollers; Figs. 9 and 10, similar views of the ends of the transoms; and, Fig. 11, a similar view of the central part of one of the side frames.

The present invention is designed to simplify the construction, and render the truck less expensive to build, easier to maintain, and simpler to manufacture than prior designs.

In the practice of the invention, referring descriptively to the specific embodiment thereof which is herein exemplified, the truck comprises two side frames, 1, 2; two transoms or transverse members, 3, 4, which connect the side frames and position them laterally, and a bolster, 5, provided with lateral extensions, 6, 7, which project through rectangular recesses or seats, 8, 8, formed in the side frames, which seats also receive the transoms, 3, 4, between which and said bolster extensions a limited lateral movement or play is permitted, as hereinafter described. The bolster extensions maintain the truck framework, as a whole, square, while the transoms maintain the side members properly spaced apart, the combination forming an interlocking framework, which perfectly maintains the alignment of the axles and other parts, while allowing flexibility laterally between the bolster and the under frame.

The bolster, 5, comprises the vertically adjustable centre plate bearing portion, 9, the reinforcing members, 10, 11, running longitudinally of the truck, from which project the lateral extensions, 6, 7, the whole being an integral casting, and said members, 10, 11, constituting side bearing means for the bolster.

Provision is made, as stated above, for a limited lateral motion of the bolster relatively to the frame, composed of the side members and transoms. To control vertical movement and to reduce friction, lugs, 6ᵇ and 7ᵇ, in which are mounted the pins 6ª and 7ª, are formed on the bolster extensions, 6 and 7, said pins projecting beneath lugs, 8ª, on the side frames, 1 and 2, thereby limiting lateral movement, and preventing lifting of the bolster. Wearing liners, 17, are inserted through openings in the sides of the extensions, 6, 7, so as to bear against the side of the recesses, 8, and rollers, 12, 12, are provided, located between roller seats, 13, 13, formed on the underside of the bolster extensions, 6, 7, and complementary roller seats, 14, 14, formed on the upper side of the end portions of the transoms, 3, 4. As shown, each of these anti-friction rollers is provided, on its ends, with gear teeth, 15, 15, which intermesh with conjugate recesses or spaces, 16, 16, formed in the ends of said seats. This construction serves to keep the rollers in their proper alinement, and prevents any relative slippage between them and the roller seats.

The wheels, axles, and brake rigging shown in Figs. 1, 2 and 3, need no specific description, as they are such as are in ordinary use, and do not form part of the present invention.

What is claimed as new and desired to be secured by Letters Patent is:

1. In a six wheel truck for railroad vehicles, a frame comprising two side or pedestal members having interlocking seats, two transoms, fitted in said seats, and a piece, functioning as a bolster and squaring member for the side frames, and fitting in said seats above the ends of said transoms but capable of limited lateral movement relatively to the frame.

2. In a six wheel truck for railroad vehicles, a frame comprising two longitudinal side members, two transverse members interlocking and in direct contact with said side members, and a bolster having arms engaging grooves in said side members, to maintain the frame square but free to move laterally to the frame.

3. In a six wheel truck for railroad vehicles, a frame comprising two longitudinal side members, two transverse members resting on and interlocking with said side members to maintain a fixed lateral spacing thereof, and a bolster having arms engaging grooves in said side members to maintain the transverse alignment of the side members but capable of a limited lateral movement with respect thereto.

4. In a six wheel truck for railroad vehicles, a frame comprising two longitudinal side members, two transverse members, resting on and interlocking with said side members to maintain a fixed lateral spacing thereof, and a bolster having arms engaging grooves in said side members to maintain the transverse alignment of the side members but capable of a limited lateral movement with respect thereto; and means for definitely limiting the lateral movement of the bolster relative to the other frame members.

5. In a six wheel truck for railway vehicles, a frame comprising side members having grooves; cross members, interlocking with said grooves; a bolster having arms also fitting in said grooves above said cross members; and rollers interposed between said arms and said cross members.

6. In a six-wheel truck for railroad vehicles, a frame composed of grooved side members and cross members secured thereto in the grooves thereof, a bolster casting, having lateral arms also fitted in said grooves above said cross members, and anti-friction rollers interposed between said arms and cross members, said rollers having gear teeth engaged in conjugate recesses formed in said arms and cross members.

7. In a six wheel truck for railroad vehicles, a frame comprising longitudinal side members having two rectangular recesses, cross members spacing said side members apart and having their ends fitted in said recesses, roller seats on said ends, a bolster casting having lateral arms also fitted in said recesses above said transom ends, roller seats in the undersurfaces of said arms, and rollers, interposed between said seats and having toothed projections engaging conjugate recesses in said seats.

8. In a six wheel truck for railroad vehicles, a frame composed of recessed side members, cross members fitted in said recesses, and a bolster casting, comprising a centre plate bearing portion, transverse squaring members and lateral extensions therefrom overhanging the ends of said cross members; anti-friction rollers between said extensions and said ends, and removable wear liners to bear against the sides of said recesses.

9. In a six wheel truck for railroad vehicles, a frame comprising two longitudinal side members having grooves; two transoms spacing the side members and interlocking with said grooves; and a member for maintaining the transverse alignment of the side members, on which are formed side bearings for maintaining the vertical stability of the superstructure which is supported by the truck.

10. In a six wheel truck for railroad vehicles, a frame comprising two longitudinal side members having grooves; two transoms spacing the side members and interlocking with said grooves; and a member for maintaining the transverse alignment of the side members, on which are formed side bearings for maintaining the vertical stability of the super-structure which is supported by the truck, and means for attaching a vertically adjustable center plate.

JAMES G. BLUNT.